US011407112B2

(12) United States Patent
Lin et al.

(10) Patent No.: US 11,407,112 B2
(45) Date of Patent: Aug. 9, 2022

(54) METHOD AND SYSTEM FOR PREDICTING COLLISION OF MACHINING PATH

(71) Applicant: Industrial Technology Research Institute, Hsin-Chu (TW)

(72) Inventors: Shu-Yu Lin, Taichung (TW); Ming-Chun Ho, Taichung (TW); Chu-Kai Huang, Changhua County (TW); Chao-Chuang Mai, Taichung County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 525 days.

(21) Appl. No.: 16/439,070

(22) Filed: Jun. 12, 2019

(65) Prior Publication Data

US 2020/0324413 A1 Oct. 15, 2020

(30) Foreign Application Priority Data

Apr. 10, 2019 (TW) .................................. 108112435

(51) Int. Cl.
*B25J 9/16* (2006.01)
*G05B 19/19* (2006.01)

(52) U.S. Cl.
CPC ............ *B25J 9/1666* (2013.01); *G05B 19/19* (2013.01); *B25J 9/1671* (2013.01); *G05B 2219/40476* (2013.01); *G05B 2219/50174* (2013.01)

(58) Field of Classification Search
CPC . B25J 9/16; B25J 9/1656; B25J 9/1664; B25J 9/1666; B25J 9/1671; G05B 19/00;
(Continued)

(56) References Cited

U.S. PATENT DOCUMENTS 6,678,582 B2 1/2004 Waled
8,577,591 B2 11/2013 Schinerl
(Continued)

FOREIGN PATENT DOCUMENTS

CN 1796046 A 7/2006
CN 101377671 A 3/2009
(Continued)

OTHER PUBLICATIONS

T Rudolf, C. Brecher et al., "Contact-based Collision Detection—A New Approach to Avoid Hard Collisions in Machine Tools", Aug. 30, 2016, https://www.researchgate.net/publication/268059611.
(Continued)

*Primary Examiner* — Khoi H Tran
*Assistant Examiner* — Sarah A Tran
(74) *Attorney, Agent, or Firm* — WPAT, PC

(57) ABSTRACT

A method for predicting collision of a machining path includes: a step of reading an NC program; a step of translating a plurality of block information in the NC program; a step of, prior to perform interpolation upon each of the plurality of block information, calculating a safety distance of a next block information with respect to a block information to be interpolated; a step of searching a number of individual block information having an accumulated distance greater than or equal to the safety distance; and a step of performing an anti-collision detection upon each of the individual block information contributing the accumulated distance. In addition, a system for predicting collision of a machining path is also provided.

7 Claims, 11 Drawing Sheets

(58) Field of Classification Search
CPC ........ G05B 19/02; G05B 19/18; G05B 19/19;
G05B 19/406; G05B 19/4061; G05B
2219/00; G05B 2219/30; G05B 2219/40;
G05B 2219/50; G05B 2219/40476; G05B
2219/50174; G05D 1/00; G05D 1/02;
G05D 1/021; G05D 1/0212; G05D
1/0223; G05D 1/0214; G05D 1/0268;
G05D 1/0274; G05D 1/0276; G05D
2201/00; G05D 2201/02
USPC ........................................................ 700/255
See application file for complete search history.

(56) References Cited

U.S. PATENT DOCUMENTS

| | | | |
|---|---|---|---|
| 8,630,732 B2 | 1/2014 | Tolkmitt | |
| 9,292,626 B2 | 3/2016 | Nelaturi et al. | |
| 9,530,246 B2 | 12/2016 | Miyata et al. | |
| 10,126,729 B2 | 11/2018 | Bretschneider et al. | |
| 10,140,395 B2 | 11/2018 | Montana et al. | |
| 2009/0062955 A1* | 3/2009 | Ide ................... | G05B 19/4061 700/178 |
| 2010/0087948 A1* | 4/2010 | Yamaguchi ........ | G05B 19/4069 700/178 |

FOREIGN PATENT DOCUMENTS

| | | |
|---|---|---|
| CN | 202317881 U | 7/2012 |
| CN | 104680587 A | 6/2015 |
| CN | 103128661 B | 12/2015 |
| CN | 106202767 A | 12/2016 |
| CN | 106383493 A | 2/2017 |
| CN | 104238433 B | 4/2017 |
| JP | H07314378 A | 12/1995 |
| TW | I428778 | 3/2014 |
| TW | I505052 | 10/2015 |
| TW | M530201 | 10/2016 |
| WO | WO2010/082378 A1 | 7/2010 |

OTHER PUBLICATIONS

Rafiq Ahmad et al., "Integration of vision based image processing for multi-axis CNC machine tool safe and efficient trajectory generation and collision avoidance", Article—Mar. 2011, vol. 10, No. 4, 2010, Journal of Machine Engineering.

Hong-Tzong Yau et al., "NC simulation for adaptive look ahead interpolator with on-line collision detection", 2016, vol. 13, No. 6, 863-871, Computer-Aided Design & Applications.

Paul Bosscher et al., "Real-time collision avoidance algorithm for robotic manipulators", 2009, pp. 113-122, IEEE.

Xu Wenzhong et al., "Sensorless robot collision detection based on optimized velocity deviation", 2017, pp. 3200-6204, IEEE.

Tetsuya Shigematsu et al., "Sensorless Tool Collision Detection for Multi-axis Machine Tools by Integration of Disturbance Information", 2016, pp. 658-663, 49th CIRP Conference on Manufacturing Systems, Published by Elsevier B.V.

TW OA dated Sep. 10, 2020.

\* cited by examiner

METHOD AND SYSTEM FOR PREDICTING COLLISION OF MACHINING PATH

CROSS REFERENCE TO RELATED APPLICATION

This application claims the benefits of Taiwan application Serial No. 108112435, filed on Apr. 10, 2019, the disclosures of which are incorporated by references herein in its entirety.

TECHNICAL FIELD

The present disclosure relates in general to a method for predicting collision of a machine tool and a system applying this method.

BACKGROUND

In the art, it is well known that the CNC (Computer numerical control) machine tool is featured in its programmability and precision machining According to machining procedures, paths and/or precision for a workpiece, a relevant CNC program can be prepared. The CNC program including contour-machining instructions and path determinations is usually organized by single-section input commands However, as the shape of workpiece becomes complicated, the section-wise CNC program may be time-consuming. Alternatively, various CAD, CAM and the like software are introduced to plan better machining paths for the CNC machine tool to perform machining In view that the current machine tool has a trend of multiple axes, compound structuring and versatile applications, the complexity of machining paths is inevitably increased, and a prediction of collisions during real machining is even hard to made by existing human inspection means. In the art, an anti-collision detection includes at least a foreign computer simulation, an idle run to verify simulation results, and a pilot or test run for online detecting. The foreign computer simulation usually needs to prepare a 3D model in advance. That is, cameras, detectors and related gears per requirements shall be integrated in advance. Also, plenty time would be consumed for preparing excessive system sources and data transmission among various controllers. In addition, the idle-run investigation, a machine run without cutting tools to follow schemes of machining paths, is unable to locate possible collisions during the machining Hence, an interpolation method is usually needed to calculate and thereby to obtain required interpolated commands for accurately and faithfully executing the preset machining paths. Thereupon, additional costs for system resources in performing the idle run can be foreseen. Further, in a typical pilot or test run (or called as an online detection), a virtual kinematic model of a machine tool and a communication interface of the corresponding controller are applied to execute an online collision test. If a collision is met, the machine will be stopped. Namely, the test run needs an additional 3D model and individual calculation for each time increment. Thereupon, huge calculations have been spent, and it is yet to be confirmed that, prior to a potential collision, the machine tool still has enough time and space to decelerate so as to avoid an incoming collision.

Thus, a topic how to provide an improved method and system for predicting collision of a machining path so as to avoid the aforesaid defects is definitely urgent and welcome to the art.

SUMMARY

In this disclosure, a method and a system for predicting collision of a machining path is provided to perform anti-collision detection with less system resources, and to predict beforehand if or not an unexpected machining action is coming, such that false machining paths can be prevented from possible damages at the machine and/or the workpiece, and further from reducing the machining yield.

In one embodiment of the disclosure, the method for predicting collision of a machining path is applicable to a machine tool including a controller further including a processing unit, and includes: a step of reading an NC program; a step of translating a plurality of block information in the NC program; a step of, prior to perform interpolation upon each of the plurality of block information, calculating a safety distance of a next block information with respect to a block information to be interpolated, wherein the safety distance is obtained by calculating a system response time and a stop distance with respect to the each of the plurality of block information; a step of searching a number of individual block information having an accumulated distance greater than or equal to the safety distance, wherein the accumulated distance is obtained by orderly calculating and accumulating the stop distances with respect the individual block information; and a step of performing an anti-collision detection upon each of the individual block information contributing the accumulated distance.

In another embodiment of this disclosure, a system for predicting collision of a machining path is applicable to a machine tool including a controller further including a processing unit, and includes a calculation unit and a collision-detecting unit. The calculation unit is used for receiving a plurality of block information in an NC program translated by the controller, wherein, prior to perform interpolation upon each of the plurality of block information, the calculation unit calculates a safety distance of a next block information with respect to a block information to be interpolated, the safety distance is obtained by calculating a system response time and a stop distance with respect to the each of the plurality of block information, the calculation unit searched a number of individual block information having an accumulated distance greater than or equal to the safety distance, and the accumulated distance is obtained by orderly calculating and accumulating the stop distances with respect the individual block information. The collision-detecting unit is connected with the calculation unit, and performs an anti-collision detection upon each of the individual block information contributing the accumulated distance.

As stated, in the method and system for predicting collision of a machining path provided by this disclosure, before every block information can be interpolated, the collision detection is only performed within the reasonable safety distance prior to the beginning of the machining at the instant block information. Thus, less system resources should be used for performing the anti-collision detection. In addition, since the aforesaid reasonable safety distance is also an initial safety distance for the calculation upon the next block information, thus unexpected machining can be predicted beforehand, such that false machining paths can be prevented from possible damages at the machine and/or the workpiece, and further from reducing the machining yield.

Further, since this disclosure utilizes the block information of the NC program to perform the anti-collision detection, thus prior to individual block information can be interpolated, based on the velocity of the next block information, the number of the block information needed for satisfying the safety distance can be submitted in advance to proceed collision detection through 3D simulations, and thus no more interpolation calculation is required. In comparison with the interpolation calculation, at least 40% CPU capacity can be saved, and the system machining calculation can be significantly reduced.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
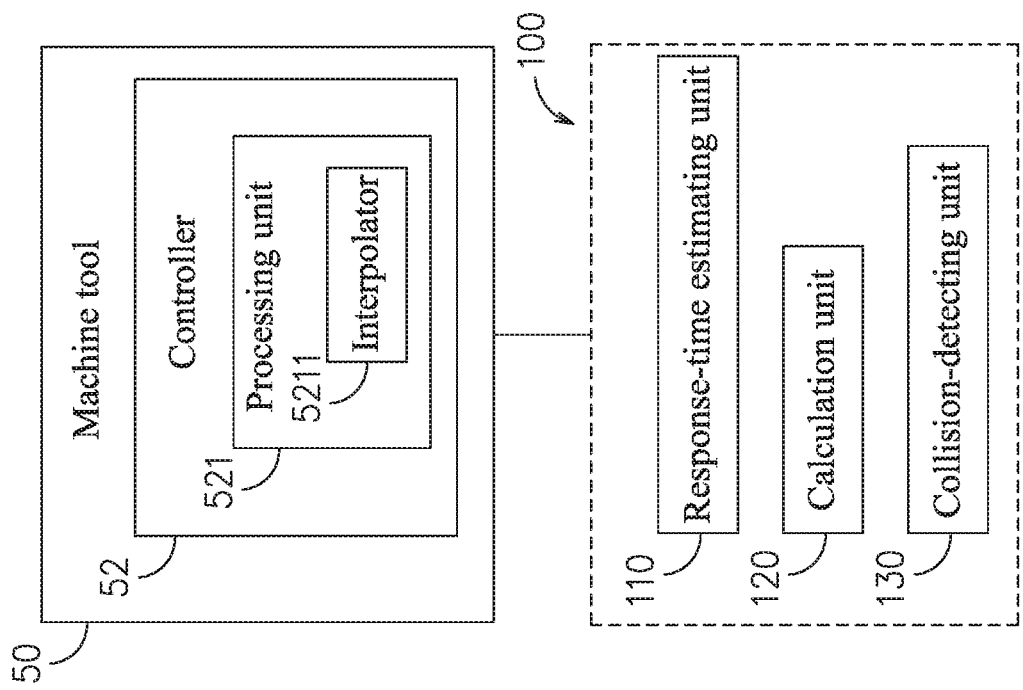
FIG. 1 is a schematic view of a preferred system for predicting collision of a machining path in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, a schematic view of a preferred system for predicting collision of a machining path in accordance with this disclosure is shown. In FIG. 1, the machine tool 50 can be any of various NC machine tools such as a milling machine, a lathe, a trampoline, a grinder or a drilling machine. The controller 52 of the machine tool 50 can be fulfilled via hardware such as an IC or a CPU, or software such as program commands performed by a processor. The controller 52 includes a processing unit 521. The controller 52 reads an NC program for controlling the processing unit 521. The processing unit 521 includes a spindle motor, a servo motor, a driver, a transformer and an electromagnetic valve of the machine tool 50. Definitely, to different machining and different machine tools, combinations for the processing unit 521 might be different or further changed.

In this embodiment, after the NC program is translated into a command format that the controller 52 can read and realize. In particular, the NC program is translated into a plurality of block information so as to obtain machining information corresponding to the NC program. In detail, the NC program is consisted of a series of block information, and a group of commands within an individual step is called as a single section. Namely, the plurality of block information are program codes of the NC program, and the block information include line numbers, spindle speeds, machining feed rates, velocities, accelerations and the like codes. These codes are in correspondence with at least one component within the processing unit 521. The NC program can be consisted of G codes (such as G00 and G01), M codes, S codes, T codes, N codes and F codes. For example, G01 stands for Move at feed rate, Z44.5 stands 44.5 units (inches for example) in the Z-axial direction, and F200 stands for 200 units (mm/min for example) of the feed speed.

In this embodiment, the processing unit 521 includes an interpolator 5211. After the processing unit 521 receives a plurality of block information of the NC program translated within the controller 52, the interpolator 5211 is then introduced to perform interpolation upon the plurality of block information within the NC program, and further corresponding interpolation commands are generated and transmitted to the spindle motor, the servo motor and the driver of the processing unit 521 for executing thereof the machining upon the workpiece.

In this embodiment, the system for predicting collision of a machining path 100, applicable to a machine tool 50, includes a response-time estimating unit 110, a calculation unit 120 and a collision-detecting unit 130. As shown, the collision-detecting unit 130 is connected to the calculation unit 120, and the calculation unit 120 is further connected to the response-time estimating unit 110. The response-time estimating unit 110 is used for estimating a system response time and then transmitting the system response time to the calculation unit 120. The response-time estimating unit 110 estimates a signal transmission time for an alarm signal issued by the collision-detecting unit 130 to be transmitted to the processing unit 521 as the system response time. In other words, the system response time is estimated by judging the transmission performance of the system for predicting collision of a machining path 100. In other embodiments, the system for predicting collision of a machining path 100 can utilize directly an internal counter or clock of the controller 52 to estimate a duration of time from a generation time of the alarm signal at the collision-detecting unit 130 to a receipt time of the alarm signal by the processing unit 521. This time duration is defined as the signal transmission time for being provided to the response-time estimating unit 110 as a reference.

It shall be explained that, in this embodiment, the system for predicting collision of a machining path 100 can connect a nearby or far-end controller 52 of the machine tool 50. For example, the system for predicting collision of a machining path 100 can include a processor of the controller 52 for performing versatile calculations, and also can be embodied as a micro controller, a microprocessor, a digital signal processor, an application-specific integrated circuit (ASIC) or a logic circuit. In another embodiment, the system for predicting collision of a machining path 100 is a processor inside the machine tool 5, and the processor is connected with a controller 52. In a further embodiment, the system for predicting collision of a machining path 100 is a cloud processor for communicating information with the controller 52 of the machine tool 50 through networking.

In this embodiment, the calculation unit 120 can be embodied through hardware such as an IC or a CPU, or software such as program commands performed by a processor. The calculation unit 120 is used for receiving a plurality of block information within the NC program translated by the controller 52. Before the interpolation can be performed upon individual block information, the calculation unit 120 calculates a safety distance between the instant block information to be interpolated and the next block information, and a number of individual block information satisfying an accumulated distance greater than or equal to the safety distance would be transmitted to the collision-detecting unit 130. In this embodiment, the accumulated distance is obtained by orderly calculating and accumulating corresponding stop distances of individual block information. The safety distance is obtained by calculating the system response time and a stop distance of the corresponding block information. The stop distance is the distance for the velocity of individual block information to decelerate to zero. A delay value is obtained by evaluating the system response time and the velocity of the corresponding block information. The safety distance is obtained by adding the delay distance and the stop distance. In other words, since the safety distance is varied in accordance with the stop distance of the corresponding block information, thus the aforesaid safety distance is not simply obtained by giving a constant or fixed distance.

In this embodiment, the collision-detecting unit 130 firstly receives the number of the individual block information transmitted from the calculation unit 120 and satisfying the accumulated distance to be greater than or equal to the safety distance. Then, the collision-detecting unit 130 performs an anti-collision detection according to individual block information within the accumulated distance. If an interference is detected (i.e., an occurrence of a collision), the collision-detecting unit 130 would issue an alarm signal to the processing unit 521, such that the processing unit 521 can stop the machining permanently or temporarily. If no collision is detected, the instant block information is sent to the interpolator 5211 for performing an interpolation. Then, corresponding interpolation commands are sent to the spindle motor, the servo motor and the driver of the processing unit 521 for executing thereof the machining upon the workpiece.

Upon such an arrangement, in this embodiment, the system for predicting collision of a machining path 100 is to detect possible collisions within a reasonable safety distance only prior to a beginning of the block information, before interpolation upon individual block information is performed. Thus, less system resources are required for performing the anti-collision detection, and the reasonable safety distance is an initial safety distance for calculating next block information. Therefore, it can be predicted in advance if or not there exists unexpected machining Thereupon, machine or workpiece damage caused by following an ill or false planned path can be avoided, such that the machining yield can be ensured.

Figure 2:
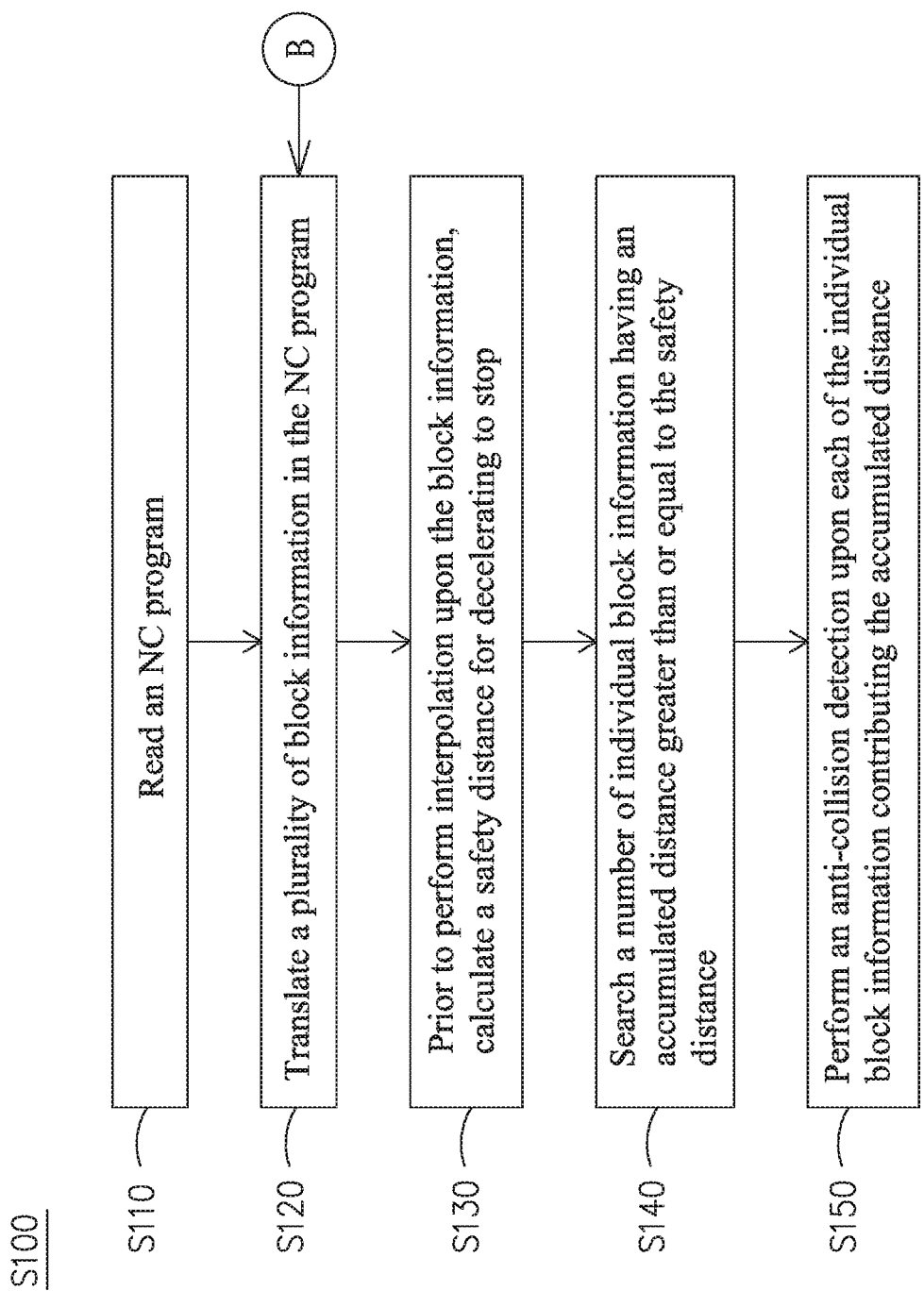
FIG. 2 is a flowchart of the method for predicting collision of a machining path in accordance with this disclosure.

Referring now to FIG. 2, a flowchart of the method for predicting collision of a machining path in accordance with this disclosure is shown. In this embodiment, the method for predicting collision of a machining path S100 can be performed through the system for predicting collision of a machining path 100 of FIG. 1. The method for predicting collision of a machining path S100 can be performed by the controller 52 of the machine tool 50, and the controller 52 is used for reading the NC program and providing a system response time to the processing unit 521.

In this embodiment, the method for predicting collision of a machining path S100 includes step S110 to step S150 as follows. In performing step S110, the NC program is read by the controller 52 of the machine tool 50. In reading the NC program, following detail steps are included. Firstly, a signal transmission time between the controller 52 and the processing unit 521 is estimated to be a system response time. Then, the response-time estimating unit 110 is used for estimating the system response time and further transmitting the system response time to the calculation unit 120. The response-time estimating unit 110 has the signal transmission time needed for the collision-detecting unit 130 to issue an alarm signal to the processing unit 521 to be the system response time. In other words, the system response time is estimated in accordance with variations in the transmission performance of the system for predicting collision of a machining path 100. In other embodiments, the system for predicting collision of a machining path 100 can utilize directly an internal counter or clock of the controller 52 to estimate a time duration from a generation time of the alarm signal at the collision-detecting unit 130 to a receipt time of the alarm signal by the processing unit 521. This time duration is defined as the signal transmission time for being provided to the response-time estimating unit 110 as a reference.

Then, in performing step S120, a plurality of block information of the NC program is translated. The NC program is translated and transformed into a readable and reasonable command format to the controller 52. In particular, the NC program is translated into a plurality of single block information so as to obtain machining information with respect to the NC program.

Then, in performing step S130, before the interpolation is performed to individual block information, a safety distance for decelerating to stop (i.e., a zero velocity) is calculated for a next block information with respect to the instant block information to be interpolated. As shown in FIG. 1, the calculation unit 120 receives a plurality of block information within the NC program translated by the controller 52. In addition, before the block information is interpolated, the safety distance for decelerating to stop is calculated for the next block information with respect to the instant block information to be interpolated, in which the safety distance is obtained by calculating a system response time and stop distances with respect to individual block information.

Figure 3:
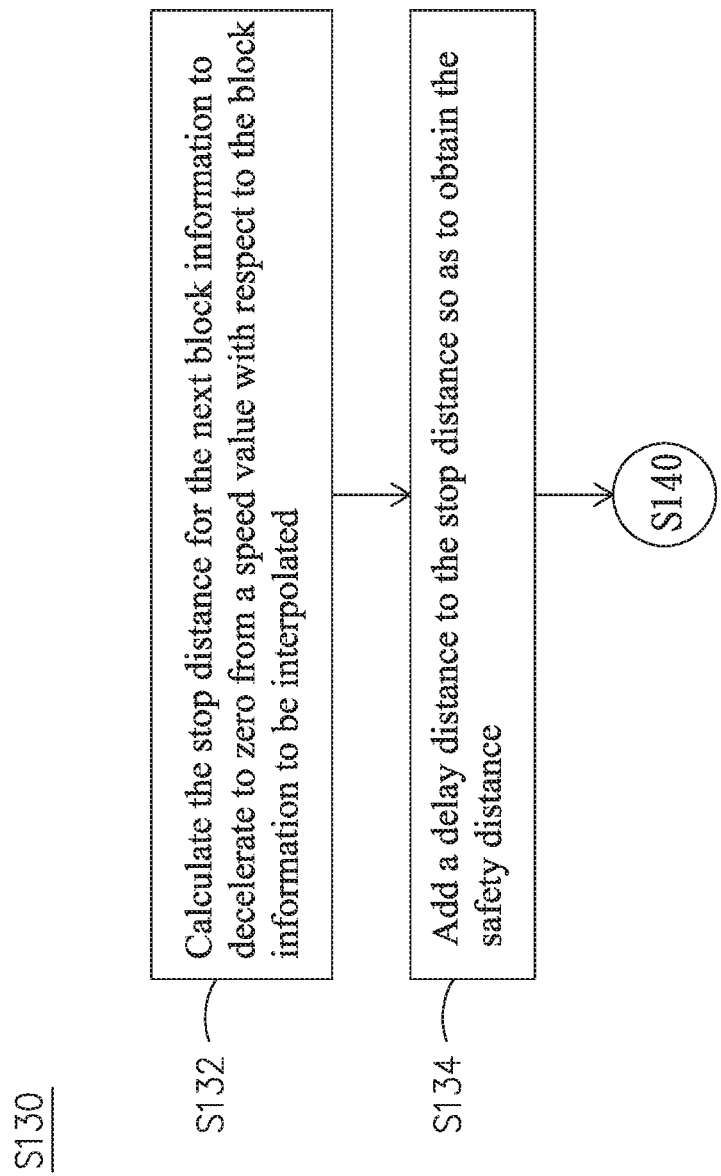
FIG. 3 is a flowchart of calculation of a safety distance in accordance with this disclosure.

Referring now to FIG. 3, a flowchart of calculation of a safety distance in accordance with this disclosure is provided. As shown in FIG. 3, in step S130 of calculating the safety distance for the next block information with respect to the instant block information to be interpolated, detail steps S132 to S134 are included. In performing step S132, a stop distance is calculated for a speed value of the next block information with respect to the instant block information to decelerate to zero. For example, in the case that the instant block information to be interpolated is the third block information, then, according to machining parameters such as the machining feed rate, velocity and acceleration at the initial point of the fourth block information, the calculation unit 120 calculates the stop distance for the fourth block information to stop from the instant speed value, and the stop distances for the individual block information would vary in accordance with the individual speed values. In addition, based on the system response time caused by a signal communication delay or a network transmission delay between two transmission interfaces, step S134 is performed to add a delay distance and the corresponding stop distance so as to obtain the safety distance, in which the delay distance is obtained by evaluating the speed values with respect to individual block information and the system response time. In other words, since the safety distance is varied in accordance with the stop distance of the corresponding block information, thus the aforesaid safety distance is not simply obtained by giving a constant or fixed distance. Referring back to FIG. 2, after step S130 calculates the safety distance of the next block information with respect to the block information to be interpolated, then step S140 is performed to search the number of the individual block information satisfying individual accumulated distances to be greater than or equal to the corresponding safety distances. Referring to FIG. 1, the calculation unit 120 evaluates each speed value of the block information to calculate the corresponding stop distance, and the stop distances of the corresponding block information are summed together to obtain an accumulated distance.

Figure 4:
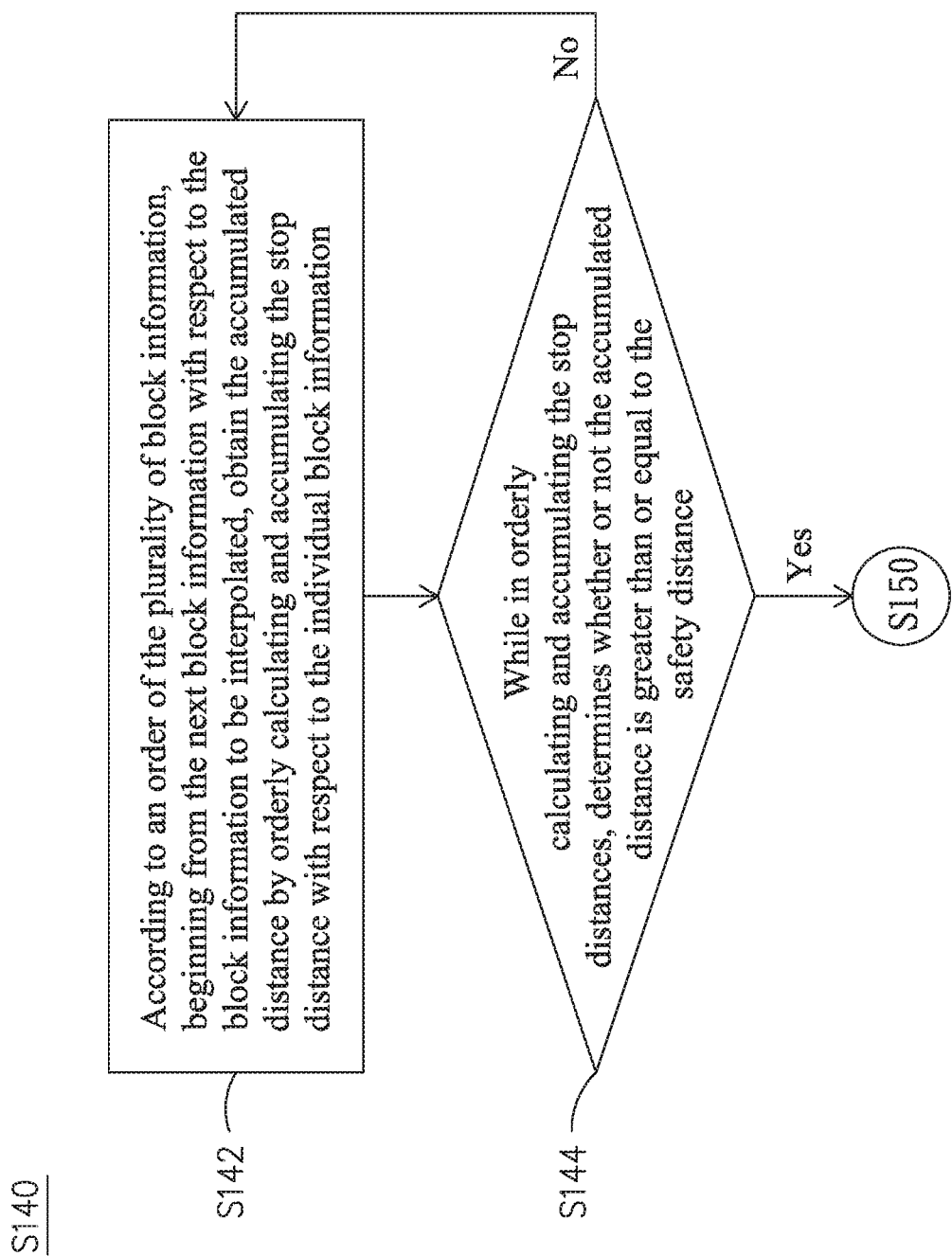
FIG. 4 is a flowchart of a search of an accumulated distance that is greater than or equal to the safety distance in accordance with this disclosure.

Referring now to FIG. 4, a flowchart of a search of an accumulated distance that is greater than or equal to the safety distance in accordance with this disclosure is provided. The step S140 of searching the number of the individual information having individual accumulated distances greater than or equal to the corresponding safety distances include steps S142 to S144 as follows. In performing step S142, according to an order of a plurality of block information, beginning from the next block information with respect to the instant block information to be interpolated, corresponding stop distances with respect to individual block information are orderly calculated and accumulated. Then, in performing step S144, during the calculation and accumulation of the stop distances, it is determined whether or not the accumulated distance is greater than or equal to the safety distance.

Referring to FIG. 1, in the case that the third block information is treated as the instant block information to be interpolated, the calculation unit 120 calculates the stop distance for the fourth block information to stop from a current speed value to be 5 mm, and the delay distance is defined as 5 mm, then the safety distance would be 10 mm In particular, if the fourth block information is to undergo a bi-axial movement having a 3-mm X-axial displacement and a 4-mm Z-axial displacement, then the actual displacement for the fourth block information (i.e., the current accumulated distance) would be 5 mm At this moment, the calculation unit 120 judges that the current accumulated distance (5 mm) is smaller than the safety distance 10 mm, and thus step S142 is then performed to further proceed the calculation of the next block information. Namely, if the accumulated distance is less than the safety distance, then calculation and accumulation of the stop distances of individual block information won't be stopped until the aforesaid criterion (the accumulated distance being greater than or equal to the safety distance) is satisfied. In this example, it implies that the calculation of the stop distance of the fifth block information is necessary. If the stop distance of the fifth block information is determined to be 4 mm by the calculation unit 120, then the accumulate distance by adding the stop distances of the fourth and the fifth block information would be 9 mm At this moment, the calculation unit 120 judges that the current 9-mm accumulated distance is still less than the 10-mm safety distance, and thus step S142 is then performed again upon the sixth block information so as to obtain a 0.5-mm stop distance. Obviously, even now, the accumulated distance is still an insufficient 9.5-mm distance by adding the stop distances of the fourth, the fifth and the sixth block information. Hence, upon the calculation unit 120 judges that the instant accumulated distance (9.5 mm) is still less than the required 10-mm safety distance, so step S142 is performed again upon the seventh block information so as to obtain another 0.5-mm stop distance. Now, the accumulated distance is 10 mm by adding the stop distances of the fourth, the fifth, the sixth and the seventh block information, and the calculation unit 120 determines that the aforesaid criterion upon the safety distance (10-mm at least) is achieved for now the 10-mm accumulated distance is equal to the required safety distance. Thus, the calculation unit 120 would determine not to perform step S142 again. Upon such an arrangement, only upon when the criterion of the accumulated distance being greater than or equal to the safety distance is fulfilled in reciprocally performing step S144 of this embodiment to orderly calculate and accumulate the following stop distances upon the next block information, then step S150 can be performed.

Figure 5:
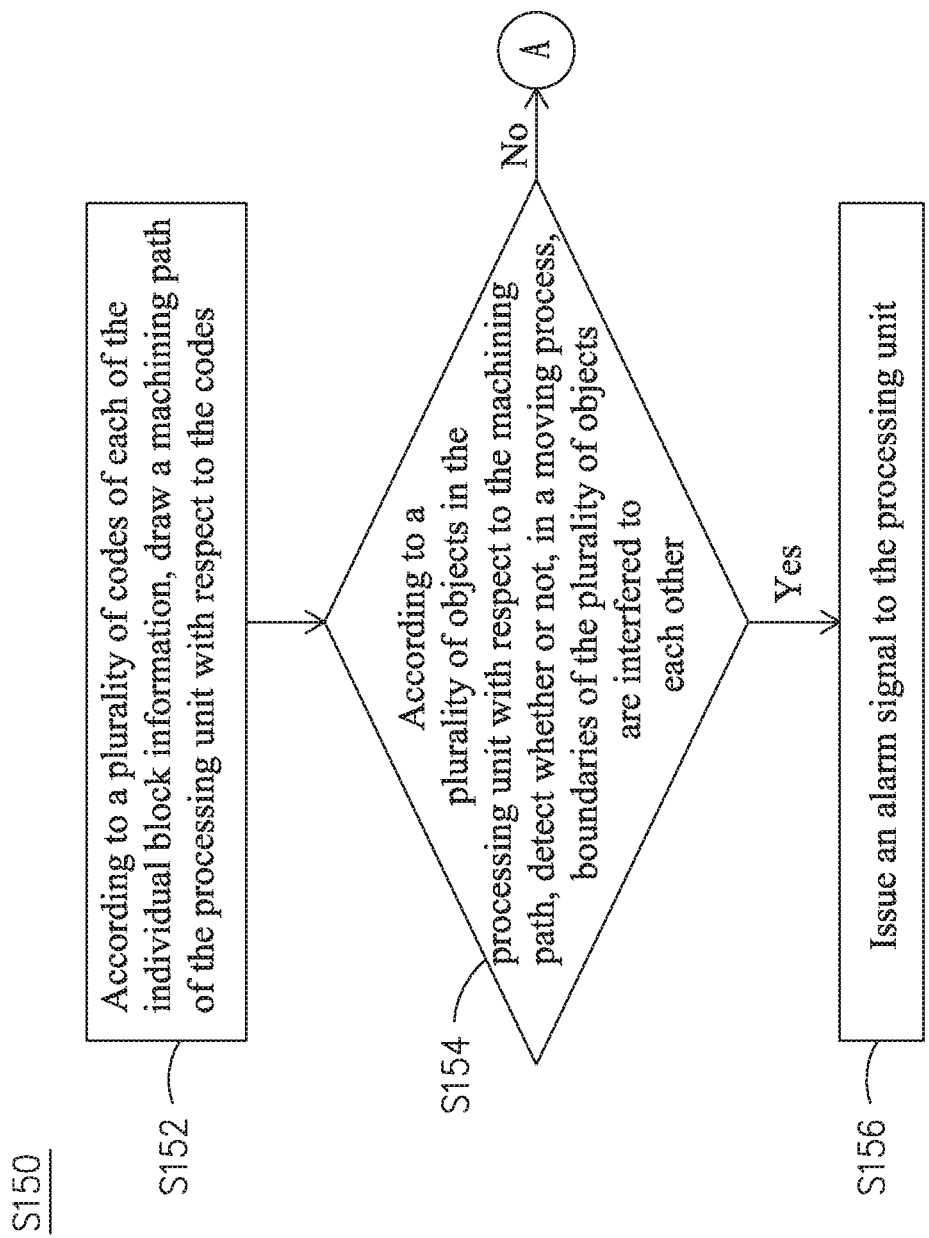
FIG. 5 is a flowchart of anti-collision detection in accordance with this disclosure.

Referring to FIG. 2, in performing step S150 of this embodiment, individual anti-collision detection are performed upon all block information undergoing the calculation of accumulating the stop distances for the satisfied safety distance. For the same example, the calculation unit 120 would transmit the fourth, the fifth, the sixth and the seventh block information to the collision-detecting unit 130 for continuing the anti-collision detection. Referring now to FIG. 5, a flowchart of the anti-collision detection in accordance with this disclosure is provided. Step S150 for performing individual anti-collision detection upon the block information contributing the accumulated distances includes in detail step S152 to step S156 as follows. In performing step S152, according to a plurality of codes for individual block information, a machining path of the processing unit is plotted in correspondence with these codes. In this disclosure, the block information may include codes for line number, spindle speed, machining feed rate, velocity, acceleration and so on, and each of the plurality of codes can be expressed or plotted in a command format of a line, an arc or a curve.

Figures 6A, 6B:
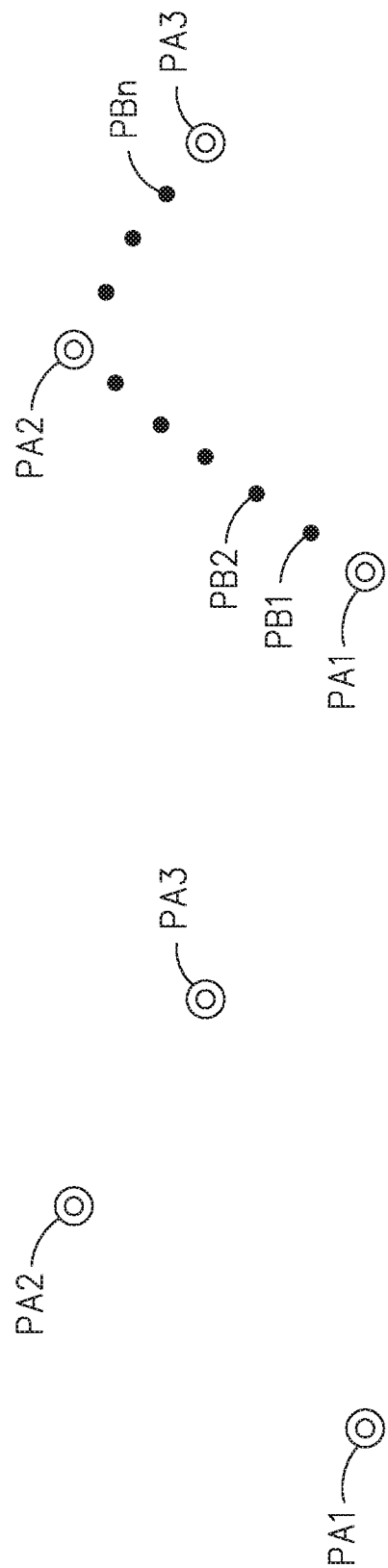
FIG. 6A is a schematic view of an embodiment of NC command points with respect to codes of block information in accordance with this disclosure.
FIG. 6B is a schematic view of an embodiment of conventional interpolation between two neighboring NC command points via interpolation points.
Figure 6D:
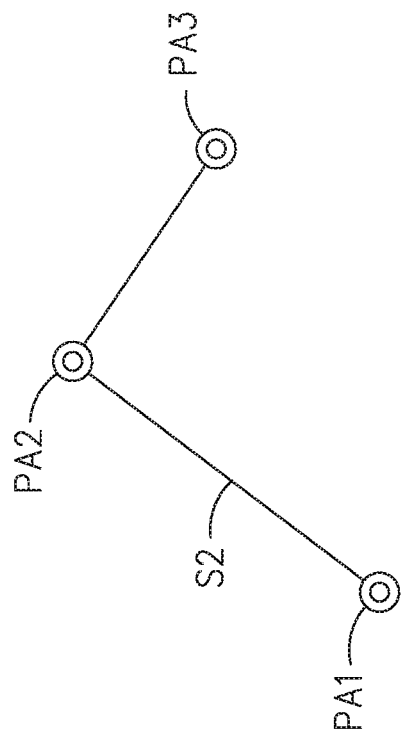
FIG. 6D shows schematically a line-format embodiment of the 3D drawing path in accordance with this disclosure.
Figure 6C:
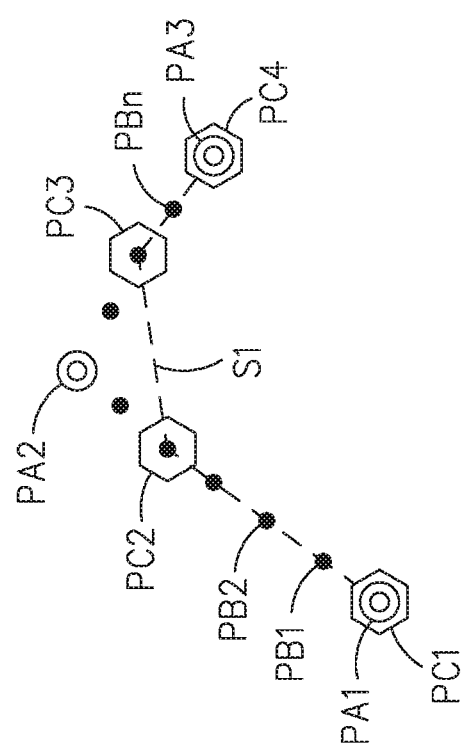
FIG. 6C shows schematically a line-format embodiment of the 3D drawing path of FIG. 6B.

For example, as shown in FIG. 6A, codes of the block information are transformed into three corresponding NC command points PA1~PA3. As shown in FIG. 6B, generally speaking, the block information is interpolated by the interpolator S211. As interpolation is performed to these three NC command points PA1~PA3, multiple interpolation points PB1~PBn would be generated among the NC command points PA1~PA3. In the path formed by integrating the interpolation points PB1~PBn, a conventional human-machine interface and the controller would corporate to transmit coordinates of the aforesaid interpolation points PB1~PBn in a fixed time period, such that a required path can be plotted. Since sampling is performed within a fixed time period in accordance with this disclosure, thus it is reasonable that not all of the coordinates of the interpolation points PB1~PBn can be sampled. As shown in FIG. 6C, it is obviously seen that differences exist among a line-format 3D drawing path, a 3D drawing path 51 formed by sampled points PC1~PC4 and the real machining path. On the other hand, in this embodiment, the collision-detecting unit 130 follows faithfully the codes of the block information to organize the 3D plot. As shown in FIG. 6D, a line-format path is provided by connecting linearly the NC command point PA1 and the NC command point PA2. In comparison with the aforesaid 3D drawing path failing to fulfill the real machining path, the line-format machining path of the 3D drawing path S2 by linearly connecting the NC command point PA2 and the NC command point PA3 can ensure authenticity of the simulated machining path under following testing of the anti-collision detection. In other words, this embodiment in accordance with this disclosure requires no interpolation, and thus fidelity concerns upon the 3D drawing path would be substantially removed. Thereupon, failure to detect unexpected collisions caused by distortions between the simulated machining path and the real machining path would be significantly reduced.

Figure 7B:
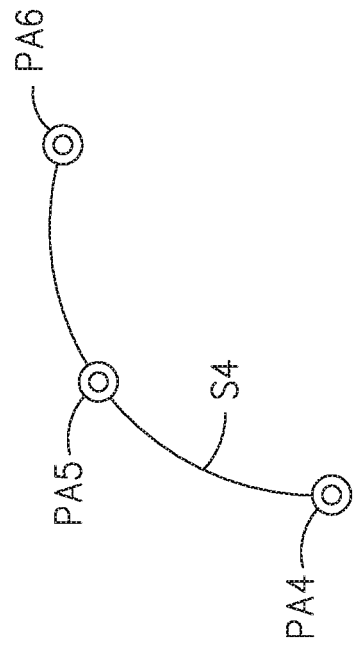
FIG. 7B shows schematically an arc-format embodiment of the drawing path in accordance with this disclosure.
Figure 7A:
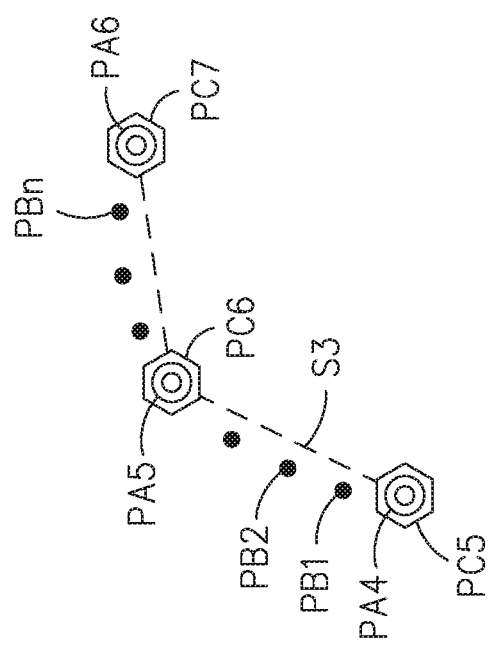
FIG. 7A shows schematically an arc-format embodiment of the 3D drawing path by using conventional interpolation points.

Similarly, as shown in FIG. 7A, an arc-format 3D drawing path is provided, in which codes of the block information are transformed into three corresponding NC command points PA4~PA6. In this embodiment, the block information is interpolated by the interpolator S211. The interpolation upon the three NC command points PA4~PA6 would generate multiple interpolation points PB1~PBn. Within the path formed by the interpolation points PB1~PBn, a conventional human-machine interface and the controller would corporate to transmit coordinates of the aforesaid interpolation points PB1~PBn in a fixed time period, such that a required arc-format path can be plotted. As shown in FIG. 7A, since the sampling points PCS~PC7 are not completely matched with the coordinates of the interpolation points PB1~PBn, thus the plotted 3D drawing path S3 from the sampling points PCS~PC7 cannot form a satisfied arc shape. Obviously, differences with respect to the real machining path can be seen. On the other hand, in this embodiment, the collision-detecting unit 130 follows faithfully the codes of the block information to organize the 3D plot. As shown in FIG. 7B, an arc-format path (i.e., a simulated arc-format machining path S4) is provided by connecting the NC command point PA4 and the NC command point PAS, and the NC command point PAS and the NC command point PA6 with relevant arcs. Clearly, the distortion between the 3D simulated drawing path and the real machining path is not significant anymore.

Figure 8A:
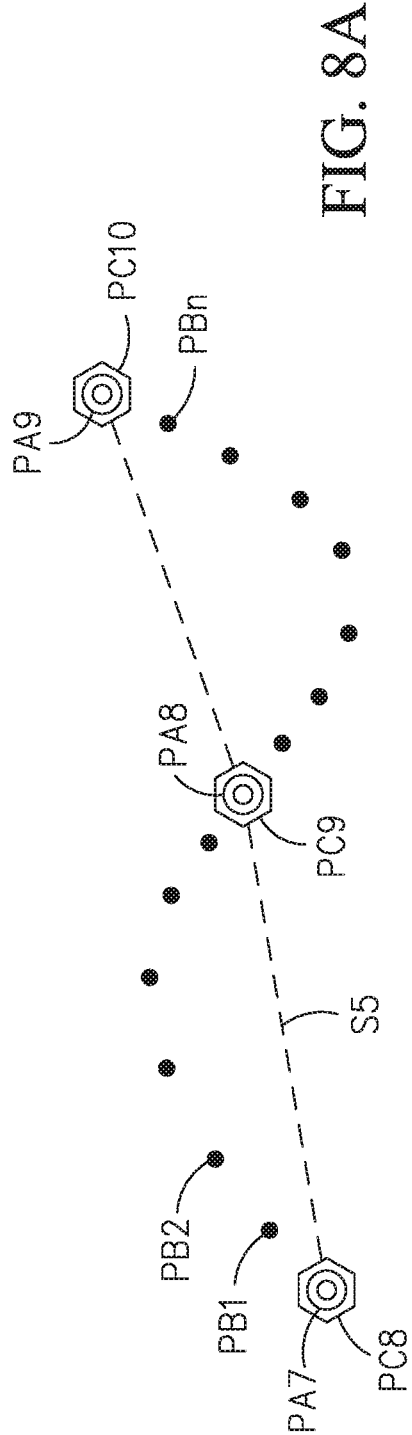
FIG. 8A shows schematically a curve-format embodiment of the 3D drawing path by using conventional interpolation points.
Figure 8B:
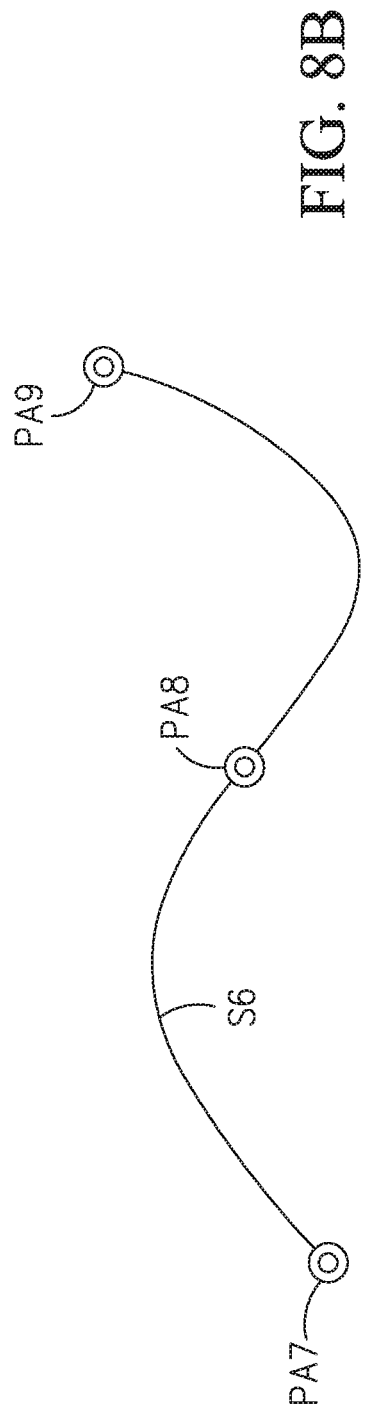
FIG. 8B shows schematically a curve-format embodiment of the drawing path in accordance with this disclosure.

Similarly, as shown in FIG. 8A, a curve-format 3D drawing path is provided, in which codes of the block information are transformed into three corresponding NC command points PA7~PA9. In this embodiment, the block information is interpolated by the interpolator S211. The interpolation upon the three NC command points PA7~PA9 would generate multiple interpolation points PB1~PBn. Within the path formed by the interpolation points PB1~PBn, a conventional human-machine interface and the controller would corporate to transmit coordinates of the aforesaid interpolation points PB1~PBn in a fixed time period, such that a required curve-format path can be plotted. As shown in FIG. 8A, since the sampling points PC8~PC10 are not completely matched with the coordinates of the interpolation points PB1~PBn, thus the plotted 3D drawing path S5 from the sampling points PC8~PC10 cannot form a satisfied curve shape to meet the real machining path. Obviously, differences with respect to the real machining path can be seen. On the other hand, in this embodiment, the collision-detecting unit 130 follows faithfully the codes of the block information to organize the 3D plot. As shown in FIG. 8B, a curve-format path (i.e., a simulated curve-format machining path S6) is provided by connecting the NC command point PA7 and the NC command point PA8, and the NC command point PA8 and the NC command point PA9 with relevant arcs. Clearly, the distortion between the 3D simulated drawing path and the real machining path is not remarkable anymore.

Figure 9A:
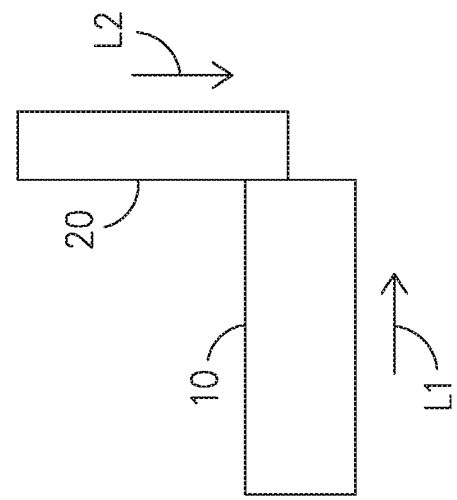
FIG. 9A and FIG. 9B are schematically two exemplary examples of an embodiment of a collision-detecting unit in accordance with this disclosure.
Figure 9B:
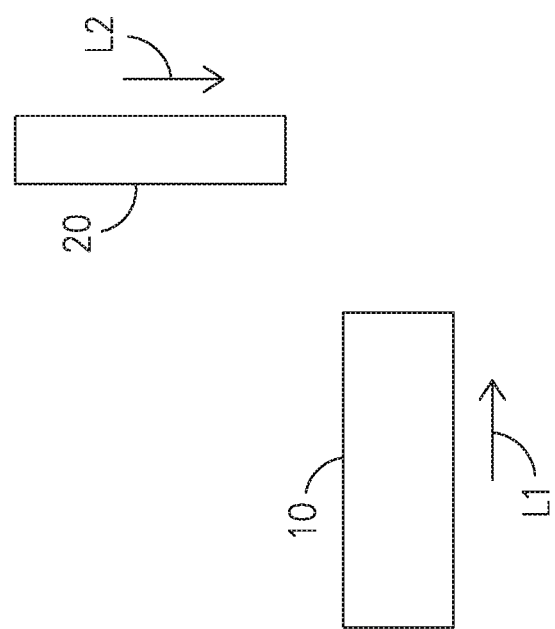

After step S152 is performed to plot the machining path for the processing unit according to the aforesaid codes, then step S154 is performed. As shown in FIG. 5, according to a plurality of objects within the processing unit 521 with respect to the machining path, it is investigated whether or not, in the moving process, boundaries of a plurality of objects are interfered. The collision-detecting unit 130 of FIG. 1 treats the plurality of objects within the processing unit 521 with respect to the machining path as a unique piece to form an integrated boundary. As shown in FIG. 9A, the first object 10 displaces along the machining path in the first direction L1, and the second object 20 displaces along the machining path in the second direction L2, in which the first direction L1 is not the same as the second direction L2. In particular, the first direction L1 is perpendicular to the second direction L2. The collision-detecting unit 130 of FIG. 1 detects whether or not boundaries of the first object 10 and the second object 20 are interfered to each other during the moving process. If the boundary of the first object 10 is contacted with or overlapped by the boundary of the second object 20, the collision-detecting unit 130 would determine that the first object 10 and the second object 20 would be interfered to each other while in moving along the machining path. Namely, at least a collision is met. As shown in FIG. 9B, a collision is met if the boundary of the first object 10 and the boundary of the second object 20 is touched or interfered to each other. If the interference or collision exists, then perform step S156, and issue an alarm signal to the processing unit 521. Referring to FIG. 1, at this time, the collision-detecting unit 130 generates an alarm signal to the processing unit 521, and thereby machining performed by the processing unit 521 is stopped directly or temporarily. It shall be noted that, for a concise and convenient explanation, dimensions of elements in FIG. 9A and FIG. 9B are somehow exaggerated or neglected, and are not to meet the practical sizes.

Figure 10:
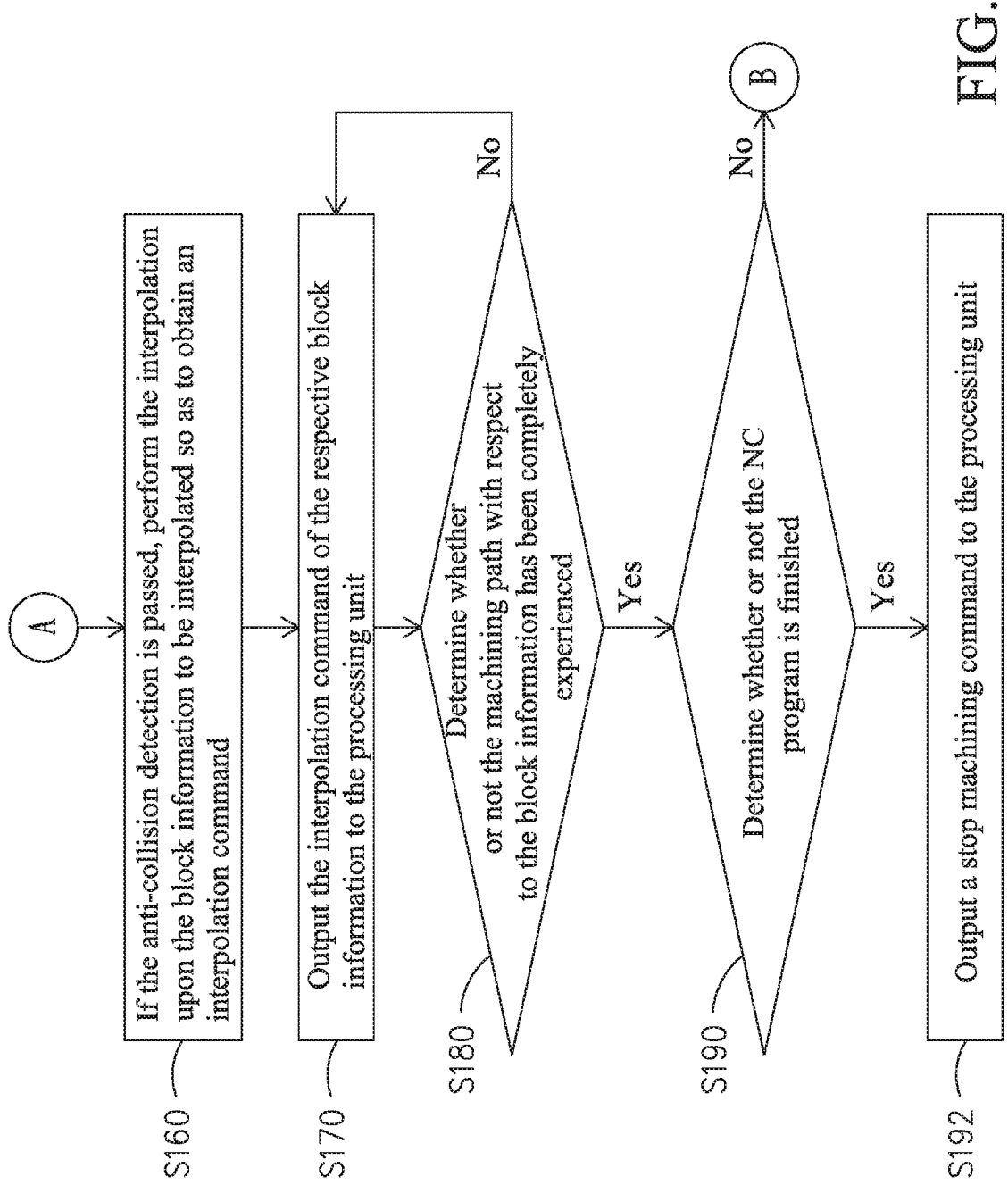
FIG. 10 is a flowchart of passing the anti-collision detection in accordance with this disclosure.

On the other hand, if, in step S154, boundaries of a plurality of objects are not interfered with each other. Then, it means that the boundaries of the plurality of objects are detected by the collision-detecting unit 130 to have no overlapping or collisions. Thus, stage A can be performed. Referring now to FIG. 10, a flowchart of passing the anti-collision detection in accordance with this disclosure. In performing step S160, if the anti-collision detection is passed, then the interpolation will be performed onto the block information to be interpolated, such that a corresponding interpolation command can be obtained. Referring to FIG. 1, the interpolator S211 is used to perform the interpolation upon the plurality of block information in the NC program. In performing step S170, interpolation commands with respect to the corresponding block information are outputted to the processing unit 521. Referring to FIG. 1, the controller 52 outputs the interpolation commands to the spindle motor, the servo motor and the driver of the processing unit 521, such that these spindle motor, servo motor and driver can be controlled to perform machining steps upon the workpiece. Then, in performing step S180, it predetermined whether or not the corresponding machining path for the individual block information has been experienced. If negative, then go back to perform step S170 for continuing outputting the interpolation commands to the corresponding block information. On the other hand, if the corresponding machining path for the individual block information has been experienced, then step S170 is finished, and further step S190 is performed to determine whether or not the NC program is over. That is, it is determined whether or not all the block information in the NC program has been run. If negative, then go to stage B; i.e., to perform step S120 of FIG. 2. Then, a plurality of block information in the NC program is translated. Otherwise, upon after all the block information in the NC program have been run, step S192 is performed to have the controller 52 to output a stop machining command the processing unit 521.

In summary, in the method and system for predicting collision of a machining path provided by this disclosure, before every block information can be interpolated, the collision detection is only performed within the reasonable safety distance prior to the beginning of the machining at the instant block information. Thus, less system resources should be used for performing the anti-collision detection. In addition, since the aforesaid reasonable safety distance is also an initial safety distance for the calculation upon the next block information, thus unexpected machining cab be predicted beforehand, such that false machining paths can be prevented from possible damages at the machine and/or the workpiece, and further from reducing the machining yield.

Further, in comparison with errors at the conventional technique that are caused by sampling upon the interpolation points, this disclosure proceeds the 3D drawing path according to the codes of the block information. Thereupon, there is no more the situation that the 3D drawing path fails to fulfill the real machining path, and thereby the authenticity of the simulated machining path for testing of the anti-collision detection can be ensured. In other words, this embodiment in accordance with this disclosure requires no interpolation, and thus fidelity concerns upon the 3D drawing path would be substantially removed. Thereupon, failure to detect unexpected collisions caused by distortions between the simulated machining path and the real machining path would be significantly reduced.

In addition, since this disclosure utilizes the block information of the NC program to perform the anti-collision detection, thus prior to individual block information can be interpolated, based on the velocity of the next block information, the number of the block information needed for satisfying the safety distance can be submitted in advance to proceed collision detection through 3D simulations, and thus no more interpolation calculation is required. In comparison with the interpolation calculation, at least 40% CPU capacity can be saved, and the system machining calculation can be significantly reduced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for predicting collision of a machining path, applicable to a machine tool including a controller, the controller including a processing unit, the method for predicting collision of the machining path comprising the steps of:
   (a) reading an NC program;
   (b) translating a plurality of block information in the NC program;
   (c) prior to perform interpolation upon each of the plurality of block information, calculating a safety distance of a next block information with respect to a block information to be interpolated, wherein the safety distance is obtained by calculating a system response time and a stop distance with respect to the each of the plurality of block information; wherein step (c) includes steps of:
   (c1) calculating the stop distance for the next block information to decelerate to zero from a speed value with respect to the block information to be interpolated; and
   (c2) adding a delay distance to the stop distance so as to obtain the safety distance, wherein the delay distance is derived from the system response time and the speed values with respect to the individual block information;
   (d) searching a number of individual block information having an accumulated distance greater than or equal to the safety distance, wherein the accumulated distance is obtained by orderly calculating and accumulating the stop distances with respect the individual block information; and wherein step (d) includes steps of:
   (d1) according to an order of the plurality of block information, beginning from the next block information with respect to the block information to be interpolated, obtaining the accumulated distance by orderly calculating and accumulating the stop distance with respect to the individual block information; and
   (d2) while in orderly calculating and accumulating the stop distances, determining whether or not the accumulated distance is greater than or equal to the safety distance; and
   (e) performing an anti-collision detection upon each of the individual block information contributing to the accumulated distance when the accumulated distance is greater than or equal to the safety distance; wherein step (e) includes steps of:
   (e1) according to a plurality of codes of each of the individual block information, drawing a machining path of the processing unit with respect to the codes;
   (e2) according to a plurality of objects in the processing unit with respect to the machining path, detecting whether or not, in a moving process, boundaries of the plurality of objects are interfered to each other; and
   (e3) if the boundaries of the plurality of objects are interfered to each other, issuing an alarm signal to the processing unit.

2. The method for predicting collision of a machining path of claim 1, wherein the step (d2) includes a step of: if the accumulated distance is smaller than the safety distance, keeping the calculating and accumulating the stop distance with respect to the individual block information, till the accumulated distance greater than or equal to the safety distance is obtained.

3. The method for predicting collision of a machining path of claim 1, wherein each of the codes includes a command format of a line, an arc or a curve.

4. The method for predicting collision of a machining path of claim 1, wherein the step (a) includes a step of: estimating a signal transmission time for the alarm signal to reach the processing unit as the system response time.

5. The method for predicting collision of a machining path of claim 1, after the step (e), further including the steps of:
   (f) If the anti-collision detection is passed, performing the interpolation upon the block information to be interpolated so as to obtain an interpolation command; and
   (g) Outputting the interpolation command of the respective block information to the processing unit, determining whether or not the machining path with respect to the block information has been completely experienced; if positive, determining whether or not the NC program is finished; and, if the NC program is finished, outputting a stop machining command to the processing unit.

6. The method for predicting collision of a machining path of claim 5, wherein the step of determining whether or not the machining path with respect to the block information has been completely experienced includes a step of: if negative, keeping the outputting the interpolation command of the respective block information.

7. The method for predicting collision of a machining path of claim 5, wherein the step of determining whether or not the NC program is finished includes a step of: if the NC program is not finished, keeping the translating the plurality of block information in the NC program.

\* \* \* \* \*